United States Patent
Peraza et al.

(10) Patent No.: US 8,745,620 B2
(45) Date of Patent: Jun. 3, 2014

(54) SOFTWARE TOOL AND METHOD FOR UPDATING A VIRTUAL APPLIANCE

(75) Inventors: David Peraza, Miami, FL (US); Hypatia Rojas, Round Rock, TX (US); Frank Schwichtenberg, Natick, MA (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 13/084,213

(22) Filed: Apr. 11, 2011

(65) Prior Publication Data

US 2012/0260249 A1 Oct. 11, 2012

(51) Int. Cl.
*G06F 9/455* (2006.01)

(52) U.S. Cl.
USPC .......................................... 718/1

(58) Field of Classification Search
None
See application file for complete search history.

(56) References Cited

U.S. PATENT DOCUMENTS

| | | | |
|---|---|---|---|
| 2006/0277542 A1* | 12/2006 | Wipfel | 717/174 |
| 2008/0163171 A1* | 7/2008 | Chess et al. | 717/120 |
| 2008/0163194 A1* | 7/2008 | Dias et al. | 717/174 |
| 2009/0217244 A1 | 8/2009 | Bozak et al. | |
| 2009/0217263 A1 | 8/2009 | Gebhart et al. | |
| 2010/0257523 A1* | 10/2010 | Frank | 718/1 |
| 2010/0313200 A1* | 12/2010 | Rozee et al. | 718/1 |
| 2011/0126193 A1* | 5/2011 | Mullin et al. | 718/1 |
| 2011/0265077 A1* | 10/2011 | Collison et al. | 717/172 |

OTHER PUBLICATIONS

VMware Studio, http://www.vmware.com/appliances/getting-started/learn/vmware_studio.html, Mar. 15, 2011.
Virtual Appliance Marketplace, http://www.vmware.com/appliances/directory/, Mar. 15, 2011.

* cited by examiner

*Primary Examiner* — Emerson Puente
*Assistant Examiner* — Dong Kim
(74) *Attorney, Agent, or Firm* — Martin & Associates LLC; Derek P. Martin (57) ABSTRACT

A virtual appliance update mechanism detects when an update to a corresponding workload is made, and makes automatic corresponding changes to the virtual appliance to reflect the update to the workload. In one specific implementation, the virtual appliance update mechanism determines that configuration units corresponding to the update to the workload are present in a knowledge base of configuration units, and automatically updates the virtual appliance with the configuration units corresponding to the update. In this manner a virtual appliance may be automatically updated based on an update to a workload, thereby assuring the virtual appliance reflects the current state of the workload.

15 Claims, 6 Drawing Sheets

FIG. 10

SOFTWARE TOOL AND METHOD FOR UPDATING A VIRTUAL APPLIANCE

BACKGROUND

1. Technical Field

This disclosure generally relates to computer systems, and more specifically relates to the update of a virtual appliance such as an open virtualization appliance (OVA) that may be deployed in a cloud computing environment.

2. Background Art

Cloud computing has become an area of emphasis for software and website providers. Cloud computing is a general term for presenting computation, software, data access, and storage services in a manner that the end-user has no knowledge of the physical location and configuration of the system that delivers the services. Cloud computing relies heavily on virtualized resources. Thus, for software to be deployed in a cloud computing environment, the software is generally described as running on one or more virtual servers. When the user executes the software, the user has no idea the location or number of physical servers that deliver the virtualized software.

The term "virtual appliance" has been used to describe a virtual software image designed to run on a virtualization platform. A typical virtual appliance includes a group of master disk images and metadata describing the virtual systems needed to boot and run the software stack stored in the disk images. A virtual appliance is usually constructed to host a single software application. A virtual appliance thus represents a new way of deploying network software applications. The disk images and metadata describing the virtual appliance may be provided in Open Virtualization Format (OVF). OVF is an open standard for packaging and distributing virtual appliances to be run by a hypervisor. An OVF package generally consists of several files, including virtual systems disk images and an OVF file describing the virtual system, placed in one directory. The OVF package may be compressed as a single file known as an Open Virtualization Appliance (OVA).

When a virtual appliance is deployed and running in a cloud computing environment, it is referred to as a "workload." Once the virtual appliance is running as a workload, changes to the workload (such as software updates) may be needed, which may affect the definition of the virtual appliance. In the prior art, a user would have to make an update to the workload, and if that update also requires an update to the virtual appliance, the user would then have to manually make the needed updates to the virtual appliance.

BRIEF SUMMARY

A virtual appliance update mechanism detects when an update to a corresponding workload is made, and makes automatic corresponding changes to the virtual appliance to reflect the update to the workload. In one specific implementation, the virtual appliance update mechanism determines that configuration units corresponding to the update to the workload are present in a knowledge base of configuration units, and automatically updates the virtual appliance with the configuration units corresponding to the update. In this manner a virtual appliance may be automatically updated based on an update to a workload, thereby assuring the virtual appliance reflects the current state of the workload.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The claims and disclosure herein provide a virtual appliance update mechanism that detects when an update to a corresponding workload is made, and makes automatic corresponding changes to the virtual appliance to reflect the update to the workload. In one specific implementation, the virtual appliance update mechanism determines that configuration units corresponding to the update to the workload are present in a knowledge base of configuration units, and automatically adds to the virtual appliance the configuration units corresponding to the update. In this manner a virtual appliance may be automatically updated based on an update to a workload, thereby assuring the virtual appliance reflects the current state of the workload.

Figure 1:
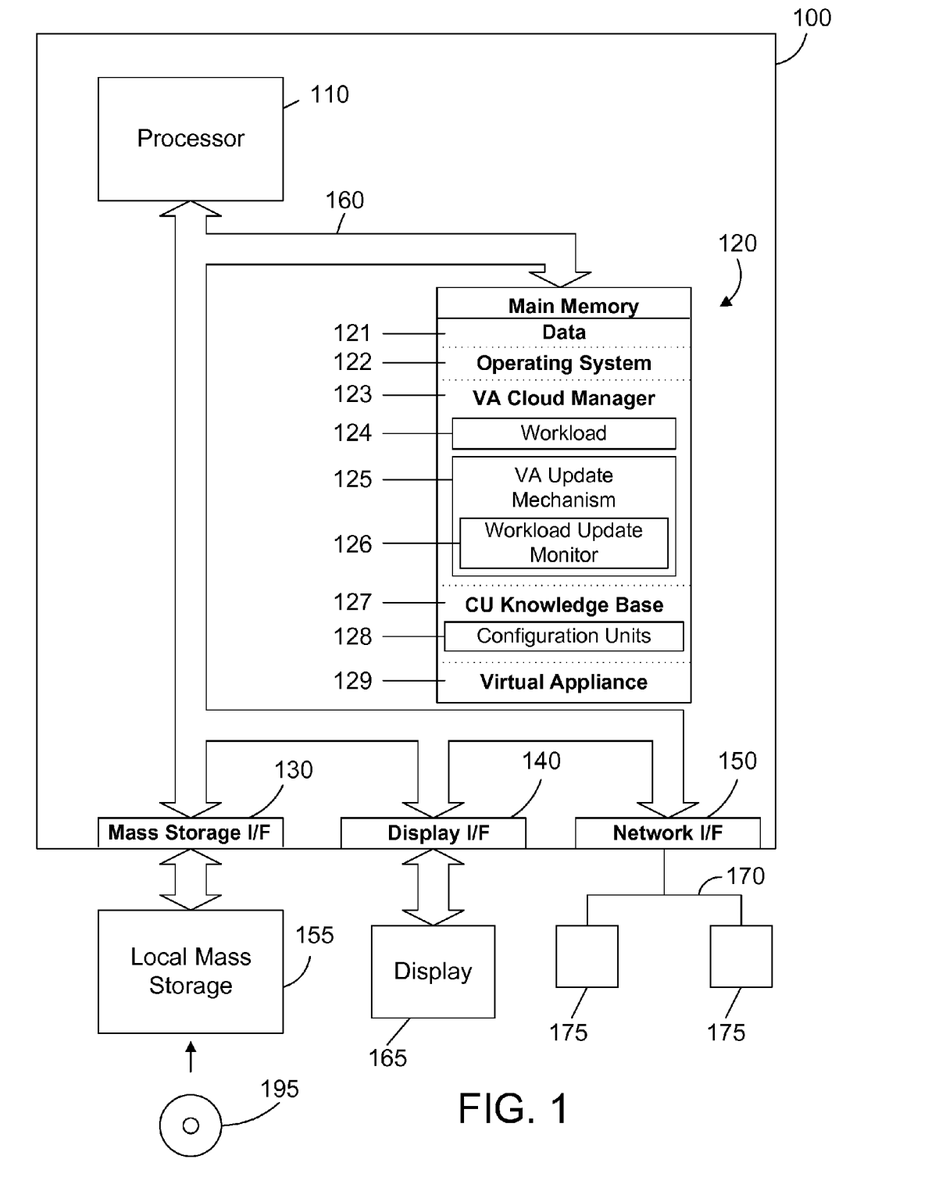
FIG. 1 is a block diagram of an apparatus that includes a virtual appliance (VA) update mechanism that is used to automatically update a virtual appliance based on an update to a workload.

Referring to FIG. 1, a computer system 100 is one suitable implementation of a computer system that includes a virtual appliance update mechanism. Computer system 100 is an IBM eServer System x computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, a virtual appliance (VA) cloud manager 123, a configuration unit (CU) knowledge base 127, and a virtual appliance 129. Data 121 represents any data that serves as input to or output from any program in computer system 100. Operating system 122 is a multitasking operating system. VA cloud manager 123 manages the deployment of a virtual appliance 129 into a workload 124. Workload 124 represents a virtual appliance 129 after it has been deployed and is executed by the VA cloud manager 123. The VA cloud manager 123 also includes a virtual appliance update mechanism 125 that includes a workload update monitor 126. The workload update monitor 126 detects when an update is made to workload 124, and triggers the VA update mechanism 125 to update the corresponding virtual appliance 129 automatically when needed.

Figure 10:
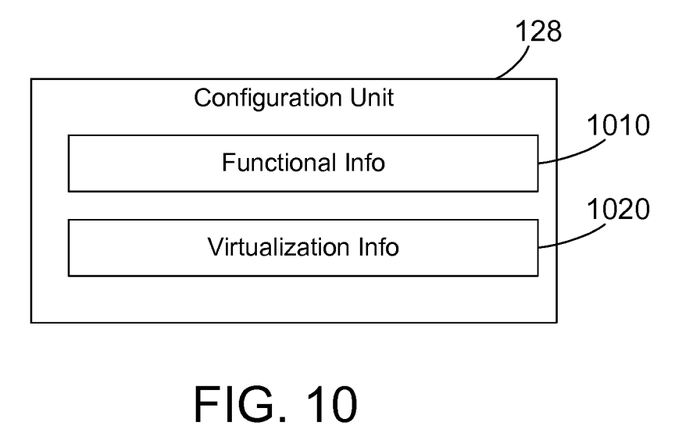
FIG. 10 is a block diagram of a configuration unit 128 shown in FIGS. 1 and 6-9.

The CU knowledge base 127 includes a plurality of configuration units 128. Each configuration unit 128 preferably includes both functional information 1010 as well as virtualization information 1020, as shown in FIG. 10. A configuration unit 128 preferably specifies all functional and virtualization information needed for a particular piece of software, such as Apache HTTP Server. A virtual appliance 129 may include a collection of configuration units 128, as shown by virtual appliance 610 in FIG. 6. In the most preferred implementation, the virtual appliance 129 is an Open Virtualization Appliance (OVA).

As used herein, the term "functional information" includes any information that describes function of a software application within the virtual appliance. Examples of suitable functional information include the name of the software, the software vendor, the software version, compatible operating systems, other software dependencies, etc. As used herein, the term "virtualization information" includes any information relating to virtualization of the software application within the virtual appliance, which may include metadata that describes how to package the software application within the virtual appliance. Examples of suitable virtualization information include software activation properties in a virtual machine, hypervisor, disk format, drivers supported by the virtualization layer, interrelationships between virtual machines (for the case of a multi-virtual machine virtual appliance), reference to the activation engine program that will run on a host virtual machine, open virtual format transport type, etc.

While the CU knowledge base 127 is shown to reside in memory 120 of computer system 100 in FIG. 1, the CU knowledge base 127 could be a local database, could be a remote database, or could be any suitable collection of data stored in any suitable manner or location. In one specific implementation, the CU knowledge base could include a collection of databases publicly accessible via the Internet. Thus, each software vendor could provide its own CU knowledge base for its own products. In the alternative, several knowledge bases could exist that each includes different configuration units. If this is the case, different knowledge bases could be interrogated to select and retrieve configuration units for a given virtual appliance.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, VA cloud manager 123, CU knowledge base 127 and virtual appliance 129 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the VA cloud manager 123, which in turn executes the VA update mechanism 125.

Although computer system 100 is shown to contain only a single processor and a single system bus, those skilled in the art will appreciate that a virtual appliance update mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment.

Figure 2:
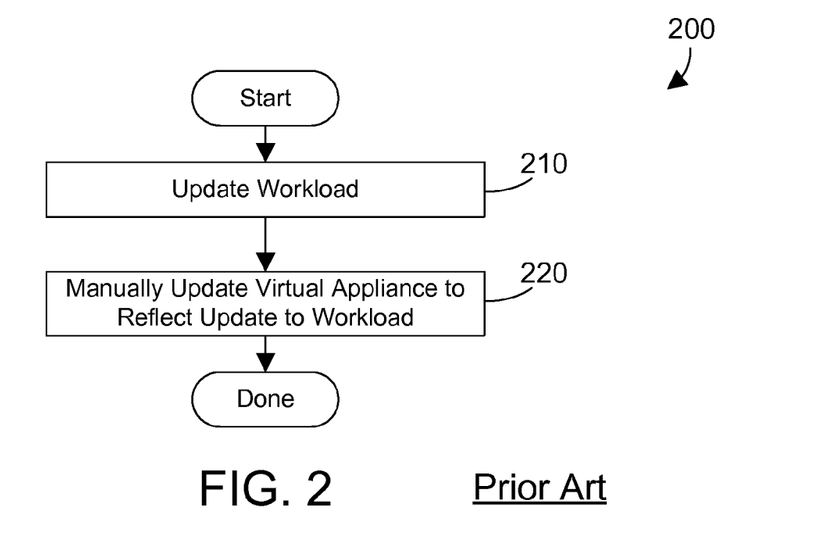
FIG. 2 is a flow diagram of a prior art method for manually updating a workload and corresponding virtual appliance.

Referring to FIG. 2, a prior art method 200 shows how a virtual appliance is updated in the prior art. An update to a workload is made (step 210). The virtual appliance corresponding to the workload updated in step 210 is then manually updated to reflect the update to the workload (step 220). Note that step 220 is a manual step that must be performed by a user. Because the step of updating the virtual appliance is a manual step, there is nothing in place to assure the update to the workload is reflected in the virtual appliance. As a result, it is possible for the workload to be updated without updating the virtual appliance, which results with the virtual appliance not reflecting what is in the updated workload. This becomes a problem when the out-of-date virtual appliance is deployed with the belief it is a current representation of the updated workload.

Figure 3:
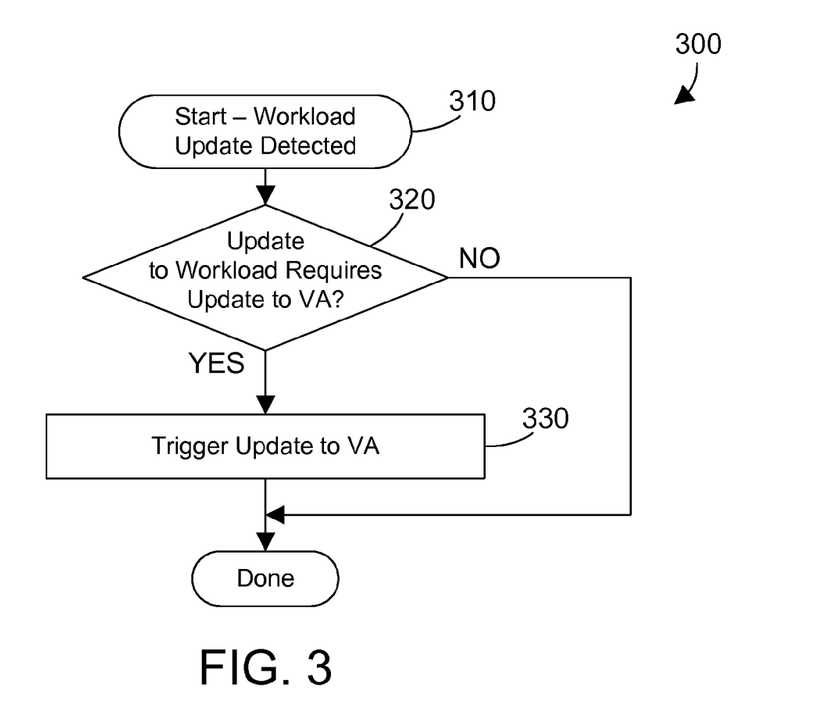
FIG. 3 is a flow diagram of a method for detecting an update to a workload, and triggering an update to a corresponding virtual appliance.

Referring to FIG. 3, a method 300 is preferably performed by the workload update monitor 126 in the VA update mechanism 125 shown in FIG. 1. Method 300 starts when a workload update is detected (step 310). If the update to the workload requires an update to the virtual appliance (step 320=YES), an update to the virtual appliance is triggered (step 330). If the update to the workload does not require an update to the virtual appliance (step 320=NO), no update to the virtual appliance is triggered, and method 300 is done. Note that some updates to the workload will not require an update to the virtual appliance. For example, a minor revision change to a computer program may not change any of the functional information 1010 or virtualization information 1020 in a configuration unit 128 for the computer program. If this is the case, no update to the corresponding virtual appliance is needed (step 320=NO). If, however, a workload is updated in a way that requires a new or additional configuration unit, the virtual appliance will need to be updated to reflect this new or additional configuration unit.

Figure 4:
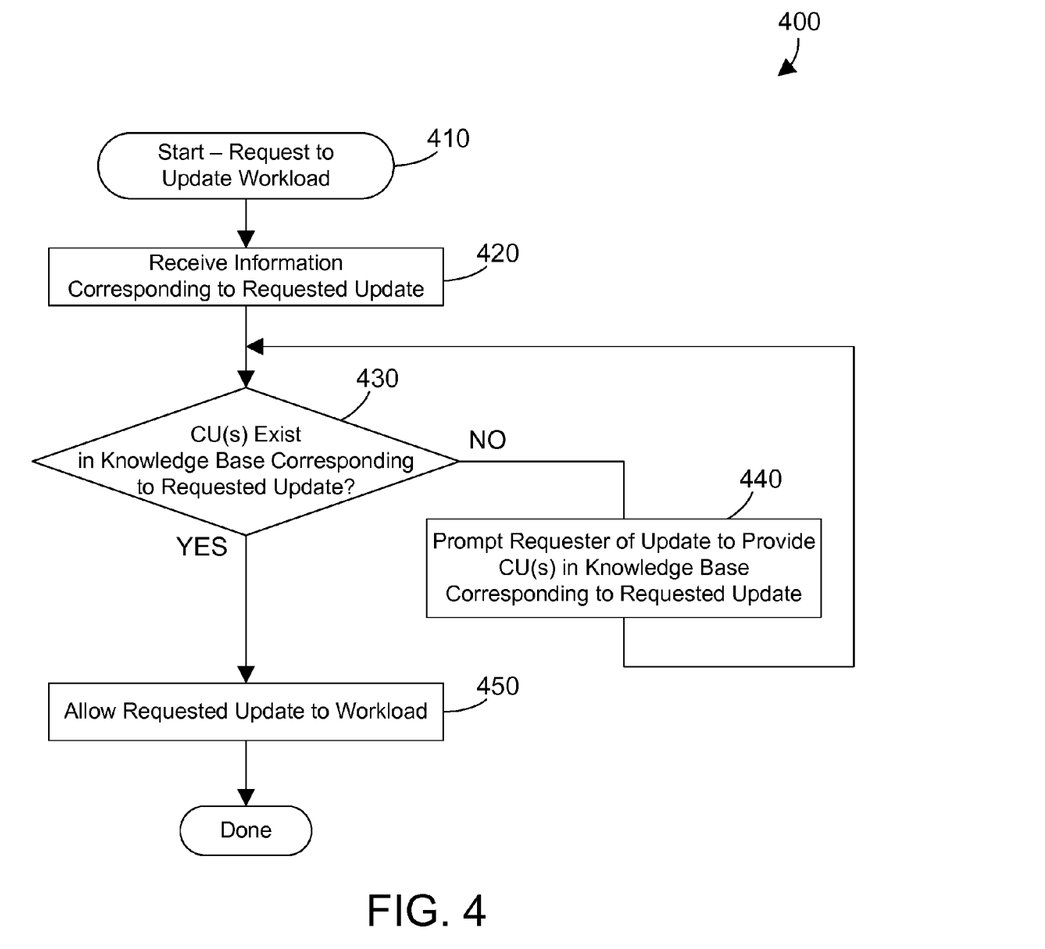
FIG. 4 is a flow diagram of a method for the workload update monitor to determine whether to allow a requested update to the workload.

Method 300 in FIG. 3 preferably starts when a workload update is detected in step 310. In the alternative, method 300 in FIG. 3 could be performed only after a requested update to a workload is requested, analyzed, and allowed. Referring to FIG. 4, a method 400 starts with a request to update a workload (step 410). Information corresponding to the requested update is received (step 420). The information corresponding to the requested update received in step 420 allows determining which configuration units correspond to the requested update. If the configuration units corresponding to the requested update exist in the knowledge base (step 430=YES), the requested update to the workload is allowed (step 450). If the configuration units corresponding to the requested update do not exist in the knowledge base (step 430=NO), the requester of the update is prompted to provide the needed configuration unit(s) in the knowledge base (step 440). Once the needed configuration units corresponding to the requested update are added to the knowledge base (step 430=YES), the requested update to the workload is allowed (step 450). Method 400 thus imposes a constraint upon those wanting to update a workload. An update to a workload is only allowed once the configuration units for the update are added to the knowledge base. In this manner the automatic updating of the virtual appliance corresponding to the workload will be assured because the needed configuration units for the update to the virtual appliance are guaranteed to be in the knowledge base before the update to the workload is allowed.

Figure 5:
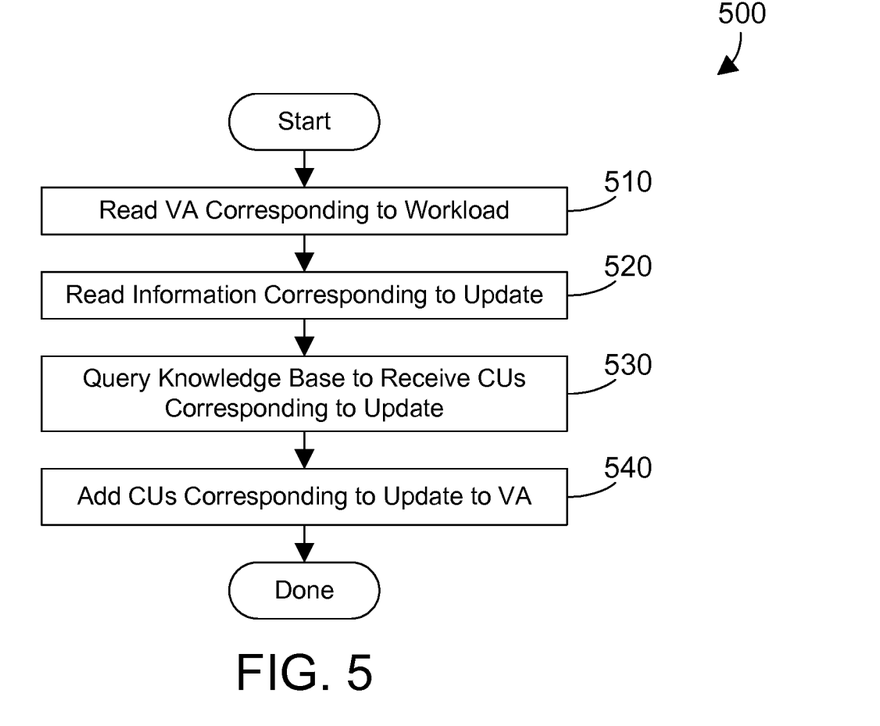
FIG. 5 is a flow diagram of a method for the virtual appliance update mechanism to update a virtual appliance automatically based on a detected update to a workload.

Referring to FIG. 5, a method 500 is preferably executed by the VA update mechanism 125 in FIG. 1 after the workload update monitor 126 detects an update to a workload that requires updating the corresponding virtual appliance. The virtual appliance corresponding to the workload is read (step 510). Information corresponding to the update to the workload is also read (step 520). The information read in step 520 identifies the configuration units needed for the update to the virtual appliance. The knowledge base is then queried for the configuration units corresponding to the update (step 530). The configuration units corresponding to the update are then added to the virtual appliance (step 540). Note the addition of configuration units corresponding to the update in step 540 may be additional configuration units in the virtual appliance, or may be configuration units that replace existing configuration units in the virtual appliance.

Figure 6:
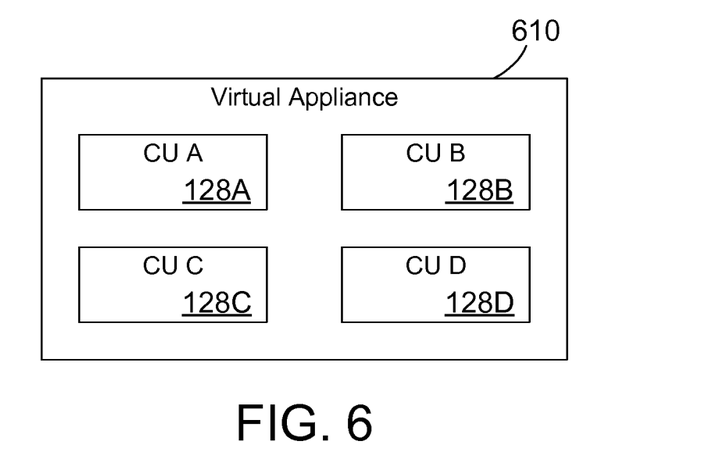
FIG. 6 is a block diagram showing a representation of a virtual appliance.
Figure 7:
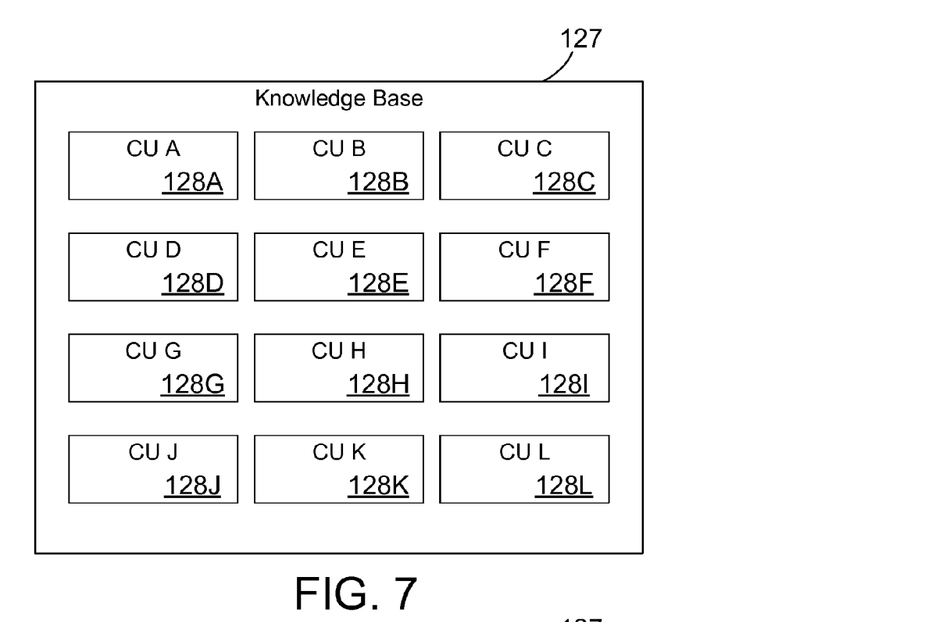
FIG. 7 is a block diagram showing a knowledge base of configuration units.
Figure 8:
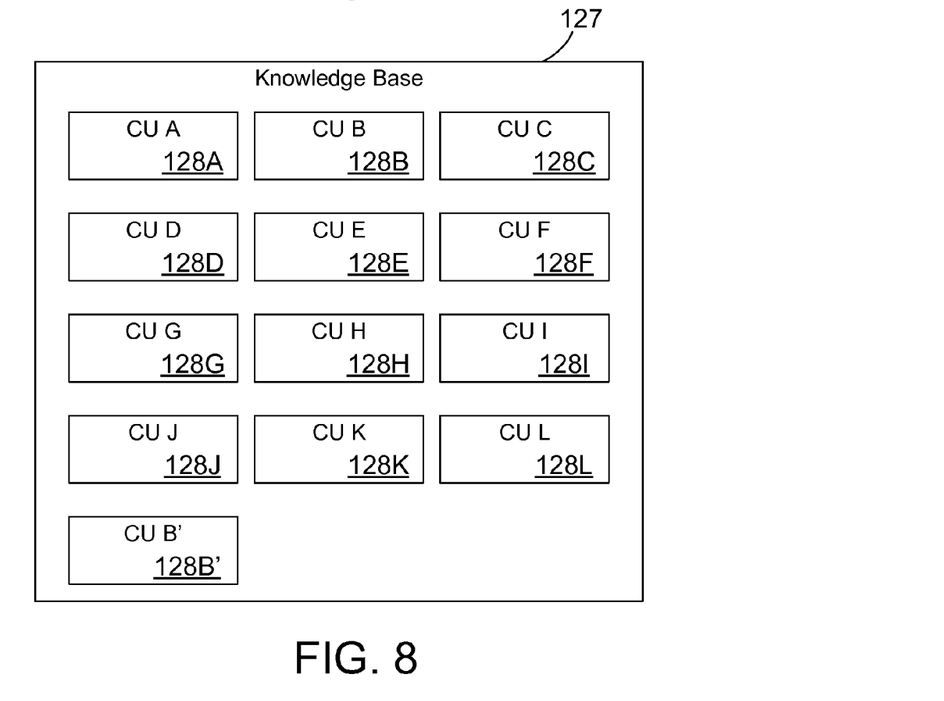
FIG. 8 is a block diagram showing the knowledge base of configuration units in FIG. 7 after configuration unit B' 128B' is added to the knowledge base.
Figure 9:
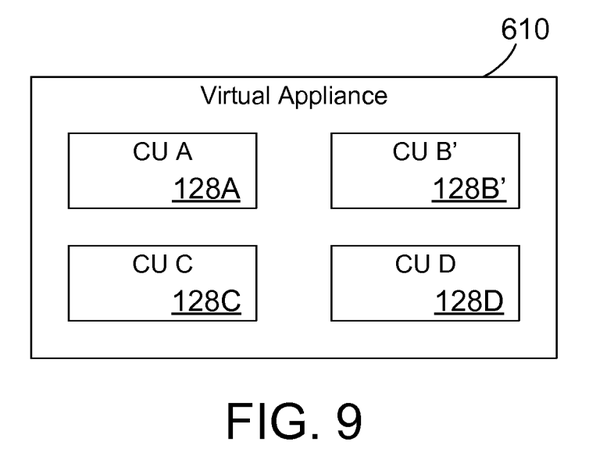
FIG. 9 is a block diagram showing the virtual appliance in FIG. 6 updated to replace CU B 128B with CU B' 128B' based on a detected update to the workload.

A simple example is now provided to illustrate the automatic updating of a virtual appliance discussed above. Referring to FIG. 6, a virtual appliance 610 is defined to include four configuration units, shown in FIG. 6 as CU A 128A, CU B 128B, CU C 128C, and CU D 128D. Virtual appliance 610 is one suitable implementation for virtual appliance 129 in FIG. 1. FIG. 7 shows a knowledge base 127 that includes twelve configuration units, including the four configuration units in the virtual appliance 610 shown in FIG. 6. We now assume a workload corresponding to the virtual appliance 610 needs to be updated. We assume the update is to a computer program corresponding to configuration unit CU B 128B shown in FIG. 6. Referring to FIG. 4, a request to update the workload corresponding to virtual appliance 610 in FIG. 6 is received (step 410). Information is received in step 420 that identifies a new configuration unit CU B' 128B'. We assume for this example the configuration unit CU B' 128B' does not exist in the knowledge base 127, as shown in FIG. 7 (step 430=NO). As a result, the requester of the update is prompted to provide CU B' 128B' in the knowledge base 127 (step 440). We assume for this example the requester then defines CU B' and adds CU B' 128B' to the knowledge base 127, as shown in FIG. 8. The CU corresponding to the requested update now exists in the knowledge base (step 430=YES), so the requested update is allowed (step 450). The update to the workload is then made. Method 500 in FIG. 5 is then performed to update the virtual appliance corresponding to the updated workload. The virtual appliance 610 in FIG. 6 is read (step 510). Information corresponding to the update is then read (step 520). The information corresponding to the update includes which configuration units in the virtual appliance 610 need to be updated. Thus, information read in step 520 identifies CU B 128B as needing to be updated with CU B' 128B' in the knowledge base shown in FIG. 8. The knowledge base is queried to receive CU B' 128B' (step 530). The virtual appliance 610 is then updated by replacing CU B 128B with CU B' 128B' as shown in FIG. 9.

The disclosure and claims are directed to a virtual appliance update mechanism that detects when an update to a corresponding workload is made, and makes automatic corresponding changes to the virtual appliance to reflect the update to the workload. The virtual appliance update mechanism determines that configuration units corresponding to the update to the workload are present in a knowledge base of configuration units, and automatically updates the virtual appliance with the configuration units corresponding to the update. In this manner a virtual appliance may be automatically updated based on an update to a workload, thereby assuring the virtual appliance reflects the current state of the workload.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a virtual appliance residing in the memory, the virtual appliance comprising a plurality of configuration units that each includes functional information and virtualization information for a computer program, wherein the functional information specifies at least one software function and the virtualization information specifies metadata that describes how to package the at least one software function within the virtual appliance;
   a workload executed by the at least one processor corresponding to the virtual appliance; and
   a virtual appliance update mechanism residing in the memory and executed by the at least one processor, the virtual appliance update mechanism receiving a request to update the workload, determining whether at least one configuration unit corresponding to the change exists in a knowledge base, and if so, allowing the requested update to the workload, and when the at least one configuration unit corresponding to the change does not exist in the knowledge base, prompting a requester of the update to provide the at least one configuration unit corresponding to the change in the knowledge base.

2. The apparatus of claim 1 wherein the corresponding change to the plurality of configuration units comprises replacing at least one of the plurality of configuration units in the virtual appliance.

3. The apparatus of claim 1 wherein the corresponding change to the plurality of configuration units comprises adding at least one configuration unit to the plurality of configuration units in the virtual appliance.

4. The apparatus of claim 1 wherein the virtual appliance is an open virtualization appliance (OVA).

5. The apparatus of claim 1 wherein the workload and the virtual appliance update mechanism are executed by a virtual appliance cloud manager.

6. A computer-implemented method executed by at least one processor for updating a virtual appliance, the method comprising the steps of:
   providing the virtual appliance comprising a plurality of configuration units, each configuration unit including functional information and corresponding virtualization information for a computer program, wherein the functional information specifies at least one software function and the virtualization information specifies metadata that describes how to package the at least one software function within the virtual appliance;

deploying the virtual appliance to generate a workload corresponding to the virtual appliance executed by the at least one processor;

receiving a request to update the workload;

determining whether at least one configuration unit corresponding to the change exists in a knowledge base;

when the at least one configuration unit corresponding to the change exists in the knowledge base, allowing the requested update to the workload; and when the at least one configuration unit corresponding to the change does not exist in the knowledge base, prompting a requester of the update to provide the at least one configuration unit corresponding to the change in the knowledge base.

7. The method of claim 6 further comprising the step of providing a knowledge base comprising the plurality of configuration units in the virtual appliance and other configuration units not in the virtual appliance.

8. The method of claim 6 wherein the step of automatically making the corresponding change to the plurality of configuration units comprises the step of replacing at least one of the plurality of configuration units in the virtual appliance.

9. The method of claim 6 wherein the step of automatically making the corresponding change to the plurality of configuration units comprises the step of adding at least one configuration unit to the plurality of configuration units in the virtual appliance.

10. The method of claim 6 wherein the virtual appliance is an open virtualization appliance (OVA).

11. The method of claim 6 wherein the method is performed as part of a web-based service that includes performing the method to an online user in exchange for payment.

12. An article of manufacture comprising software stored on a non-transitory computer readable storage medium, the software comprising:

a virtual appliance update mechanism that monitors a change to a workload executed by at least one processor, the workload representing a run-time deployment of a virtual appliance comprising a plurality of configuration units that each includes functional information and virtualization information for a computer program, wherein the functional information specifies at least one software function and the virtualization information specifies metadata that describes how to package the at least one software function within the virtual appliance, the virtual appliance update mechanism receiving a request to update the workload, determining whether at least one configuration unit corresponding to the change exists in a knowledge base, and if so, allowing the requested update to the workload, and when the at least one configuration unit corresponding to the change does not exist in the knowledge base, prompting a requester of the update to provide the at least one configuration unit corresponding to the change in the knowledge base.

13. The article of manufacture of claim 12 wherein the corresponding change to the plurality of configuration units comprises replacing at least one of the plurality of configuration units in the virtual appliance.

14. The article of manufacture of claim 12 wherein the corresponding change to the plurality of configuration units comprises adding at least one configuration unit to the plurality of configuration units in the virtual appliance.

15. The article of manufacture of claim 12 wherein the virtual appliance is an open virtualization appliance (OVA).

* * * * *